United States Patent [19]
Munk et al.

[11] Patent Number: 6,036,900
[45] Date of Patent: *Mar. 14, 2000

[54] RESIN TRANSFER IMIDIZATION OF POLYIMIDE MATRIX COMPOSITES

[75] Inventors: Russel F. Munk; Paul S. Manicke, both of Albuquerque, N.Mex.; Jack D. Fudge, Jr., Cheshire, Conn.

[73] Assignee: General Electric Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/684,374

[22] Filed: Jul. 19, 1996

[51] Int. Cl.$^7$ ..................................................... B29C 45/14
[52] U.S. Cl. ......................... 264/102; 264/257; 264/328.6
[58] Field of Search ................................. 264/102, 328.6, 264/279, 257

[56] References Cited

U.S. PATENT DOCUMENTS

| | | | |
|---|---|---|---|
| 2,913,036 | 11/1959 | Smith | 154/1.6 |
| 4,197,339 | 4/1980 | Paul et al. | 427/370 |
| 4,316,967 | 2/1982 | Hergenrother et al. | 525/111 |
| 4,499,252 | 2/1985 | Igarashi et al. | 528/38 |
| 4,560,742 | 12/1985 | Pater | 528/342 |
| 4,837,908 | 6/1989 | Beveridge, Jr. | 29/130 |
| 4,942,013 | 7/1990 | Palmer et al. | 264/511 |
| 4,973,662 | 11/1990 | Odagiri et al. | 528/353 |
| 5,104,474 | 4/1992 | Scola et al. | 156/286 |
| 5,131,827 | 7/1992 | Tasaka | 418/55.2 |
| 5,248,467 | 9/1993 | Cushman | 264/102 |
| 5,338,827 | 8/1994 | Serafini et al. | 528/353 |
| 5,433,915 | 7/1995 | Yamamoto et al. | 264/510 |
| 5,457,154 | 10/1995 | Ohta et al. | 524/600 |
| 5,470,943 | 11/1995 | Sakata et al. | 528/353 |
| 5,478,915 | 12/1995 | Amone et al. | 528/353 |
| 5,480,965 | 1/1996 | Yamashita et al. | 528/353 |
| 5,500,164 | 3/1996 | Livesay et al. | 264/102 |
| 5,506,291 | 4/1996 | Okawa et al. | 524/413 |
| 5,508,377 | 4/1996 | Yamashita et al. | 528/353 |
| 5,631,377 | 5/1997 | Matsuo et al. | 546/296 |
| 5,710,334 | 1/1998 | Ishihara et al. | 561/328 |
| 5,763,537 | 6/1998 | Yoshimura et al. | 525/436 |
| 5,866,647 | 2/1999 | Massey et al. | 524/494 |

*Primary Examiner*—Jan H. Silbaugh
*Assistant Examiner*—Stefan Staicovici
*Attorney, Agent, or Firm*—Andrew C. Hess; Gerry S. Gressel

[57] ABSTRACT

A process is provided for producing high temperature composite components from a thermosetting polyimide resin system, and more particularly to an in-mold technique for impregnating a reinforcement fiber preform with the polyimide resin system, and thereafter imidizing the polyimide resin system in such a way that exposure to the uncured (nonimidized) polyimide resin system is minimized. The process entails an injection technique that ensures complete impregnation and wetting of the reinforcing fabric, and complete removal of the condensation byproducts formed during imidization. The imidized component is then cured by heating the component to a temperature sufficient to remelt the polyimide resin system, and then applying pressure and additional heat to cause the polyimide resin system to cross-link to produce the desired composite component. The process results in a fiber-reinforced polyimide matrix component characterized by a void content of less than about three percent.

15 Claims, No Drawings

RESIN TRANSFER IMIDIZATION OF POLYIMIDE MATRIX COMPOSITES

This invention relates to methods for processing thermosetting polyimide resin systems. More particularly, this invention is directed to a method for producing composite articles from PMR-15, a thermosetting polyimide resin system, in which the process significantly reduces the labor intensity and handling costs for producing the articles, as well as minimizes hazards attributable to exposure to the uncured resin system.

BACKGROUND OF THE INVENTION

PMR-15 is a commercially-available thermosetting polyimide resin system that has found wide use as the polymer matrix for composite components that require a service temperature of up to about 290° C. (about 550° F.). This particular resin system, whose commercial sources include SP Culver City Composites, has been used to form structural and non-structural components for the aerospace industry, as well as numerous other industries. The general composition of PMR-15 is, in weight percent, about 30 to 40% methylenedianiline (MDA), about 40 to 50% benzophenone tetracarboxylic acid dimethyl ester (BTDE), and about 20 to 30% 5-norbornene-2,3-dicarboxylic acid monomethyl ester (NE). For use, the above mixture is conventionally diluted with a solvent, such as methyl alcohol (methanol), at a weight ratio of about 1:1.

Thermosetting polyimide resin systems of the type exemplified by PMR-15 have a complex reaction system. These resin systems release large amounts of volatiles, such as methanol and water, during the cure process, which complicates the processing and manufacture of quality parts. In addition, utmost care must be taken in the handling of the uncured resin system since it contains incompletely reacted MDA, which is a suspected carcinogen, can cause chemically-induced hepatitis in humans, and is a known kidney and liver toxin. Accordingly, in the processing of PMR-15 resin, precautions must be taken to minimize the risk of exposure to personnel.

The fabrication of composite components from this polyimide resin system typically involves a prepreg, which is a woven reinforcement fabric that has been impregnated with the uncured resin system. Conversion of the resin and a suitable reinforcement structure into a prepreg that meets user specifications is a specialized process performed at a limited number of facilities. Known methods for impregnating the fabric material include solvent dilution, hot melt and powder coating techniques. Prepregs are typically produced to contain about 32 weight percent resin and about 60 volume percent fabric (after cure), with carbon and glass fiber fabrics being most common.

Typical production practices employ sheets of the prepreg on a backing material. Because they are in the uncured state, the prepregs must be kept in cold storage, typically in the form of rolls. The prepreg rolls must therefore be thawed before use, which usually requires about four hours. After thawing, the prepreg can be rolled out onto a cutting table and a portion sufficient to form the desired component is cut from the roll. The roll must then be repacked and returned to cold storage, with the out-time noted to monitor any deterioration of the prepreg. The portions are then cut to form plies which are shaped and oriented with respect to the fabric weave of the prepreg. The plies are numbered, stacked in sequence for production, and placed in a plastic bag to form a kit, which is then ready for transfer to a layup area where the plies are sequentially placed in a mold to form the desired composite component. If the kit will not be used immediately, it must be returned to cold storage. The trimmings, or offal, from the cutting operation must be disposed of in a controlled landfill due to the presence of MDA in the material.

In the layup area, the kit is thawed if necessary, then removed from the bag and placed in ordered sequence on a mold surface. As each ply is positioned, the backing material must be removed and the ply oriented appropriately within the mold cavity according to the part geometry. A debulking operation must typically be performed to remove interlaminar air pockets, typically after every two to four plies are placed on the mold. The layup process is labor intensive, particularly since a number of plies are typically required to form a composite component.

Following the layup process, the component formed by the prepreg plies must be cured on the mold through the application of carefully controlled heat and pressure. The cure process generally involves three stages: imidization, final cure, and post cure. Imidization involves a prescribed heat cycle that is applied through the mold to the component, causing condensation and other reactions to occur by which the constituent monomers of the resin system form an uncross-linked polyimide resin. Upon imidization, the monomer MDA is chemically reacted with other monomers to form the polyimide, and is therefore no longer the previously-noted health hazard. The resulting imidized component may then be removed from the mold, since the use of separate imidization and final cure molds improves the throughput of the fabrication process.

Final cure involves heating the imidized component within the cure mold to a level where the imidized resin remelts and flows, after which pressure is applied to purge entrapped air. While pressure is maintained, the temperature of the imidized component is increased to about 315° C. (about 600° F.) to cause cross-linking of the polyimide, which imparts the desired structural properties for the final component. Post cure involves additional heating of the component at about 315° C. (about 600° F.) to cause additional cross-linking of the polyimide so as to increase its glass transition temperature ($T_g$), and therefore enhance the thermal properties of the component. This process is typically accomplished by baking the component in a convection oven according to a controlled heating cycle. Final manufacturing processes for the resulting composite component include trimming, machining and inspection, as required.

The complexity and labor intensive nature of processing thermosetting polyimide resin systems can be readily appreciated from the above. Particularly notable disadvantages of this process include the requirement for cold storage of the prepregs, waste and disposal of prepreg trimmings, and exposure hazards to unreacted MDA in the uncured prepreg. Resin transfer molding (RTM) techniques are known by which composite components are formed from reinforcing fibers that are impregnated in-mold with lower temperature resin systems such as epoxies. However, such techniques are not feasible for polyimide resin systems due to the high viscosity of thermosetting polyimide resins and the significant amount of condensation byproducts formed during imidization of the resins, resulting in insufficient fiber impregnation and the formation of voids within the composite component. As opposed to a prepreg which is manufactured by impregnating woven reinforcement cloth with a resin, a tow is a single fiber bundle which is impregnated with resin. Pre-imidized tow has the resin within the tow in an imidized state rather than an uncured state.

Experimentation directed to the use of pre-imidized tow, a single fiber bundle impregnated with imidized resin, has indicated complications in the fabrication of some components, particularly those with axisymmetric structures when using reinforcement fabrics having sheet woven or braided architectures. From such experiments, it has been concluded that the resin bulk (about forty to about fifty volume percent) will inhibit the fabrication of components with through-thickness reinforcement fabric preforms, such as those produced by three-dimensional braiding, knitting and weaving. The degree of compaction required to consolidate a three dimensional processed preform would be substantial and cause significant amounts of distortion or crushing of the reinforcement architecture.

Accordingly, it would be desirable if a less labor-intensive process were available by which polyimide matrix composite components could be formed with a thermosetting polyimide resin system that is imidized with minimal exposure risks to MDA, and the resulting component is capable of retaining its structural integrity at temperatures of up to about 290° C.

SUMMARY OF THE INVENTION

It is an object of this invention to provide a method for processing a thermosetting polyimide resin system, and particularly PMR-15, so as to significantly reduce the exposure risk of MDA prior to imidization of the resin system.

It is a further object of this invention that such a process entails an in-mold impregnation and imidization technique, by which the uncured resin system is injected directly into a mold, impregnates a reinforcing fabric within the mold cavity, and is thereafter imidized.

It is another object of this invention that such a process involves process parameters that are tailored to ensure complete impregnation of the reinforcing fabric and removal of condensation byproducts formed during imidization.

It is yet another object of this invention that such a process produces a polyimide matrix composite component that is capable of retaining its structural integrity at temperatures of up to about 290° C.

It is still another object of this invention that such a process lends itself to the manufacture of components using braids or 3-D woven fiber architecture, in addition to the more conventional 2-D woven architecture.

The present invention provides a process for producing high temperature composite components from the PMR-15 polyimide resin system, and more particularly to a novel technique for impregnating a reinforcement fiber preform with this polyimide resin system, and thereafter imidizing the PMR-15 polyimide resin system in such a way that exposure to the uncured polyimide resin system is minimized. Importantly, the process entails unique sequences and steps to ensure complete impregnation and wetting of the reinforcing fabric, and complete removal of the condensation byproducts and other volatiles which are produced during the process steps.

The process of this invention generally entails positioning a suitable dry-fiber (unimpregnated) preform in a mold cavity which is capable of withstanding at least moderate injection pressures. Uncured (nonimidized) thermosetting PMR-15 polyimide resin monomers that have been dissolved in a solvent are then injected into the mold cavity. The PMR-15 resin system of interest to this invention contains unreacted MDA in the uncured state. The exposure risk of RDA has been previously discussed, but advantageously is significantly reduced by the process of this invention.

The parameters of the injection process, including resin viscosity and pressure, must be controlled such that the polyimide resin system permeates and wets the fiber preform within the mold cavity. In particular, the resin is dissolved in a sufficient amount of solvent to suitably reduce its viscosity, while a pressure of not more than about one atmosphere is maintained during injection in order to avoid collapse of the preform. The mold cavity is then sufficiently heated to evaporate the solvent, whose vapors are vented or drawn from the mold. Imidization of the polyimide resin monomers is then performed by applying a vacuum to the mold cavity so as to remove condensation byproducts produced during imidization, and heating the mold cavity. The resulting imidized component is then cured by heating the component to a temperature sufficient to remelt the polyimide resin, and then applying pressure and additional heat to cause the polyimide resin to cross-link to produce the desired composite component. The curing step may be performed in a separate compression mold, in an autoclave or, if properly adapted, in the mold cavity in which the imidization process is conducted. Following cure, the composite component can undergo a post cure operation so as to achieve further cross-linking of the polyimide resin, and thereby raise its glass transition temperature.

The method of this invention results in a fiber-reinforced polyimide matrix component characterized by a void content of less than about three percent, and a high temperature service capability of up to about 290° C. Importantly, the injection process of this invention enables the PMR-15 polyimide resin to successfully permeate reinforcement preforms having complex architectures, such as two or three-dimensional braided, knitted, woven and filament wound, a capability which was previously unknown and unexpected. As such, a resulting composite component can have desirable mechanical properties that make it particularly suited for structural applications in the aerospace industry.

Other objects and advantages of this invention will be better appreciated from the following detailed description.

DETAILED DESCRIPTION OF THE INVENTION

The process of this invention is a resin transfer imidization technique that involves sequences and process steps for impregnating a fiber preform with the PMR-15 polyimide resin system containing unreacted MDA, and then converting the resin system to an imidized polyimide matrix component, while achieving an acceptably low void content in the final cured composite component and significantly reducing the exposure risk of personnel to MDA prior to imidizing the resin system. To achieve the above, the process of this invention is uniquely tailored to the processing characteristics associated with such a resin system. Prior to this invention, the solvent and condensation reactions characteristic of thermosetting polyimide resin systems containing MDA prevented the application of resin transfer methodologies to these resin systems.

The process of this invention begins by placing a dry fiber preform into a suitable mold. The fiber preform can be of any suitable material, including carbon, glass and quartz fibers. The architecture of the preform can be complex, including braided, knitted, woven and filament wound preforms, and either two or three-dimensional in nature. The mold must have gating and venting ports, as dictated by the geometry of the component to be produced, in order to facilitate resin injection and to appropriately vent condensation byproducts and volatiles from the mold cavity.

The PMR-15 polyimide resin system is then prepared by diluting uncured (nonimidized) PMR-15 monomers with a suitable quantity of solvent. Advantageously, PMR-15 exhibits a desirable combination of mechanical properties, thermal stability and cost, though it is foreseeable that other MDA-containing polyimide resin systems could be used. Because the resin system is employed in the uncured state, it contains unreacted MDA which, as noted previously, poses an exposure risk. According to this invention, the exposure risk to MDA is significantly minimized by the process of the invention. Notably, the resin system can be delivered and stored in bulk packaging, instead of the large and awkward prepregs required by the prior art and often composed of about fifty volume percent reinforcement fiber.

To achieve adequate impregnation of the preform, the resin system must be dissolved in about thirty weight percent solvent, and preferably about thirty to fifty weight percent solvent, to achieve a viscosity of about 100 centipoise (100 mpa.s) or lower. Significantly lower dilutions (e.g., about five to ten weight percent solvent) generally reduce the ability of the resin system to adequately permeate the preform and achieve complete wet-out of the reinforcement fibers. Dilutions in excess of fifty weight percent solvent require longer periods to achieve adequate evaporation of the solvent, which may be economically prohibitive. A preferred solvent for this process is methanol, though it is foreseeable that other solvents could be used, such as other alcohols or nonreactive solvents.

The diluted resin system is injected in a controlled manner into the mold cavity through an appropriate number of injection ports, such that the resin system will permeate the preform within the mold cavity. As with prior art resin transfer molding methods, the injection process of this invention includes control of the volumetric rate of injection so that resin flow does not bypass any portion of the preform and trap air within the preform, and the use of a sufficient number of vents in the mold, both of which can be ascertained through generally routine experimentation. However, unique to the process of this invention is the requirement to reduce the viscosity of the resin, as discussed above, to enable the use of an injection pressure of not higher than about one atmosphere, preferably about 7 kPa to about 100 kPa. According to this invention, the latter parameters are necessary to ensure that the resin system will successfully permeate the preform, regardless of its architecture, without damaging the preform by entraining the preform in the resin flow.

The ability to successfully impregnate and wet a preform having a complex architecture with a thermosetting polyimide resin system was previously unknown and unexpected. Specifically, the high viscosity of polyimide resins and the high volume of volatile reaction byproducts generated during cure have been impediments to the use of polyimide resins in resin transfer molding techniques. Prior art resin transfer molding techniques have required pressures in excess of one atmosphere to distribute resin and collapse voids within the resin to an acceptably small size, with pressure being maintained thereafter during cure. In contrast, the process of this invention employs two stages. The first stage is the resin transfer imidization step described above, in which the resin is distributed throughout the preform with the assistance of a solvent, and at a pressure of one atmosphere or less. Thereafter, and as will be described in more detail below, a final cure is used to remelt and consolidate the polyimide resin under pressure so as to allow for further redistribution of the resin within the fiber architecture. An important feature of this invention is that the dilution of the resin system and its injection into the mold cavity constitute the only exposure risk to MDA.

Once the mold cavity is filled with the diluted resin system, heat is applied to the mold cavity in order to evaporate the solvent and return the resin system to a suitably less diluted state. In practice, a temperature of about 65° C. to about 95° C. is preferred. To promote evaporation and removal of the solvent, a vacuum can be applied to the mold cavity through a venting port. As the solvent is evaporated, it can be condensed and collected in a vessel to more accurately determine the amount of solvent that has been removed. After removal of the solvent, or at least once the evaporation rate of the solvent has slowed, it will be desirable under most circumstances to replace at least part of the volume lost to evaporation of the solvent with additional resin. This can be done by injecting an additional quantity of the diluted resin system into the mold cavity after the heating step, and then reheating the mold cavity to evaporate the solvent introduced into the mold cavity by the additional quantity of diluted resin. This step can be repeated if necessary to achieve adequate fill of the mold cavity. Alternatively, a reservoir cavity attached to the mold may be used to automatically replenish the volume lost to evaporation of the solvent.

Imidization of the polyimide resin monomers is then performed by closing the injection ports, applying a vacuum to the mold cavity so as to remove the methyl alcohol and water condensation byproducts of imidization, and heating the mold cavity until a temperature of about 200° C. to about 215° C. is attained. The mold cavity is preferably heated in a controlled manner over a period of about four hours, more or less depending on the size of the part, in order to appropriately eliminate the condensation byproducts at a rate which can be accommodated by the mold equipment. Though variations are possible, a preferred heating schedule for the PMR-15 polyimide resin with methanol as the solvent is as follows. The mold is heated slowly from the injection temperature (about room temperature up to about 35° C.) up to a temperature of about 65° C. to about 95° C. over a period of about two to four hours. An optimal heating rate will depend on the area of the interface between the liquid and gaseous phases in the particular mold. Preferably, the heating rate is as high as can be achieved without causing the resin to froth and be carried out through the mold vents. A temperature of about 65° C. to about 95° C. is preferably maintained until most (at least about 95 weight percent) of the solvent has evaporated. If a second or subsequent injection will be done to achieve adequate fill of the mold cavity, the mold should first be cooled to the injection temperature as quickly as possible, generally about two to about five °C./minute. The injection and evaporation steps can be repeated as often as necessary. Once the mold cavity is adequately filled, the mold is heated as quickly as possible without frothing the resin (again, about two to about five °C./minute) to the final imidization temperature of about 200° C. to about 215° C.

The imidized component must then be cured by heating the component to a temperature sufficient to remelt the polyimide resin system, and then applying pressure and additional heat to cause the polyimide resin system to cross-link to produce the desired composite component. The curing step may be performed in a separate compression mold, in an autoclave or, if properly adapted, in the mold cavity in which the imidization process is conducted. Curing generally requires maintaining a temperature of up to about 315° C. while maintaining a pressure of about 1.5 to about 7 MPa (about 200 to about 1000 psi). As with the imidization process, the curing process requires a controlled heating procedure. While variations are possible, the basic and preferred cure parameters for the PMR-15 polyimide resin with methanol as the solvent are as follows. The imidized preform is heated to about 230° C. to about 260° C. as quickly as possible without causing large temperature gradients within the mold cavity. A pressure of about 1.5 to about 7 MPa (about 200 to about 1000 psi) is then applied over a period of about one to ten minutes, while heating continues to a final temperature of about 315° C., which is held for about one to two hours. During this stage, the polyimide resin cross-links.

The advantage of using a separate mold is to improve the throughput of the molding and fabrication process. Notably, the complexity, finish and strength of the mold used for final cure is not required for the imidization process. If a compression mold is used for the curing process, the imidized component must be carefully placed in the mold cavity while aligning the geometric features of the component and mold cavity to assure proper fit. The mold is then closed, heat is applied until the imidized resin system remelts, and the cure process described above is followed.

Use of an autoclave may be advantageous for large axisymmetric components or if only a small number of components are required. As with the compression mold process, the autoclave process requires carefully positioning the imidized component on the mold surface while aligning the geometric features of the component to the mold surface. For axisymmetric components, the core of the injection mold may be suitable for use as the autoclave mold. The component is then covered in a conventional manner with an appropriate release, breather and bagging materials, and the mold and component are then inserted into the autoclave where the above final cure pressure and temperature cycles are performed.

If the injection mold used in the imidization cycle is employed as the cure mold, special attention must be given to gate and vent locations, the manner in which the gates and vents are closed during compression, and the manner in which position control of the mold halves is maintained. Notably, final cure pressures are substantially higher than injection pressures, and may therefore dictate the design of the injection mold if used for both procedures. The use of the injection mold for final cure may be advantageous if the anticipated production volume of the component is small and the purchase of both an injection mold and a final cure mold is unnecessary for production rate requirements.

Following cure, the composite component can undergo a post cure operation so as to achieve further cross-linking of the polyimide resin system, and thereby raise its glass transition temperature. A preferred post cure cycle involves heating the component to a temperature of about 310° C. to about 320° C. The temperature of the component is preferably ramped at a rate of about 2.5° C./min to about 250° C., then at a rate of about 1° C./min to about 315° C., which is then held for about twenty-four hours. The component is then cooled at a rate of about 2.5° C./min to about 65° C., at which point the component is ready for further processing, including trimming, machining and inspection of the component.

The method of this invention results in a fiber-reinforced polyimide matrix component characterized by a void content of less than about three percent, and a high temperature service capability of up to about 290° C. As such, the component has desirable structural properties that make it particularly suited for structural applications in the aerospace industry. Advantageously, suitable reinforcement fiber preforms include those having complex architectures, including two or three-dimensional braided, knitted, woven and filament wound. The imidization process of this invention ensures that the polyimide resin system will successfully permeate such complex preforms, a capability which was previously unknown and unexpected.

In practice, the process of this invention has successfully employed the PMR-15 resin system to produce composite panels whose mechanical and thermal properties were essentially identical to that of otherwise identical composite panels produced by the prior art method employing uncured PMR-15 prepregs. Notably, the panels produced according to this invention exhibited less loss in mechanical and thermal properties, as compared to panels produced by the prior art method, after environmental exposure that included thermal oxidative stability and thermal cycling.

In view of the above, it can be seen that a significant advantage of the present invention is that exposure to the uncured polyimide resin system is limited to the period in which the resin system is diluted until the resin system is injected into the mold cavity. In particular, the time-consuming layup of uncured prepreg required by prior art methods is completely avoided. As a result, and an important feature of this invention, the exposure risk to MDA associated with this invention is substantially less than that of the labor intensive procedure of the prior art.

Another advantage of this invention is that the process minimizes shipping and storage costs by limiting the cold storage requirement to only the nonimidized resin system. The resin system can be stored in bulk packaging so as to further reduce the required storage space for the material. In contrast, the prior art required cold storage of a nonimidized prepreg, about fifty volume percent of which is composed of reinforcement fiber. Scrappage of nonimidized material and the requirement for proper disposal is also eliminated or at least significantly reduced by the process of this invention. Most waste generated by the invention will be nonhazardous and significantly less in volume than that previously associated with processing of thermosetting polyimide resin prepregs.

While our invention has been described in terms of a preferred embodiment, it is apparent that other forms could be adopted by one skilled in the art, such as the use of other thermosetting polyimide resin systems or solvents, or by modifying the preferred imidization and cure methods by altering temperatures and durations, substituting other processing steps, or including additional processing steps. Accordingly, the scope of our invention is to be limited only by the following claims.

What is claimed is:

1. A method for resin transfer molding a fiber-reinforced article from a thermosetting polyimide resin system consisting essentially of, in weight percent, about 30 to 40% MDA, about 40 to 50% BTDE, and about 20 to 30% NE, the method comprising the steps of:

positioning a dry fiber preform in a mold cavity, the fiber preform having a complex architecture;

diluting the thermosetting polyimide resin system with a solvent to reduce the viscosity of the thermosetting polyimide resin system and thereby form a diluted thermosetting polyimide resin system, the diluted thermosetting polyimide resin system being in an uncured state and containing unreacted MDA;

injecting the diluted thermosetting polyamide resin system into the mold cavity under a pressure of not greater than one atmosphere, such that the diluted thermosetting polyimide resin system permeates and wets the fiber preform without damaging the fiber preform;

evaporating and removing at least a portion of the solvent from the diluted thermosetting polyimide resin system to yield an undiluted thermosetting polyimide resin system;

heating the mold cavity and imidizing the undiluted thermosetting polyimide resin system to form an imidized thermosetting polyimide resin system and applying a vacuum to the mold cavity to remove condensation byproducts produced during the imidizing step; and then curing the imidized thermosetting polyimide resin system to yield a cured thermosetting polyimide resin system by heating to a temperature sufficient to remelt the imidized thermosetting polyimide resin system, and then applying pressure and additional heat to cause the remelted imidized thermosetting polyimide resin system to cross-link and thereby form the fiber reinforced article.

2. The method as recited in claim 1 wherein the curing step is performed by a process chosen from the group consisting of molding within the mold cavity, compression molding, and autoclaving.

3. The method as recited in claim 1 wherein the solvent constitutes at least 30 weight percent of the diluted thermosetting polyimide resin system after the diluting step.

4. The method as recited in claim 1 further comprising the steps of:

injecting an additional quantity of the diluted thermosetting polyimide resin system into the mold cavity after the evaporating step to compensate for the evaporation of the solvent; and heating the mold cavity to evaporate solvent in the additional quantity of the diluted thermosetting polyimide resin system.

5. The method as recited in claim 1 wherein the evaporating step further comprises applying a vacuum to the mold cavity during the evaporating step.

6. The method as recited in claim 1 wherein the diluted thermosetting polyimide resin system has a viscosity of not more than 100 centipoise after the diluting step.

7. The method as recited in claim 1 further comprising a post cure operation to achieve further cross-linking of the imidized thermosetting polyimide resin system and thereby raise the glass transition temperature of the cured thermosetting polyimide resin system.

8. The method as recited in claim 1 wherein the fiber-reinforced article produced thereby has a void content of less than three percent.

9. A method for resin transfer molding a fiber-reinforced article from a thermosetting polyimide resin system consisting essentially of, in weight percent, about 30 to 40% MDA, about 40 to 50% BTDE, and about 20 to 30% NE, the method comprising the steps of:

positioning a dry fiber preform in a mold cavity, the fiber preform having a three-dimensional architecture;

diluting the thermosetting polyimide resin system with a solvent to form a diluted thermosetting polyimide resin system having a viscosity of about 100 centipoise or less, the diluted thermosetting polyimide resin system being in an uncured state and containing unreacted MDA;

injecting the diluted thermosetting polyimide resin system under a pressure of not greater than one atmosphere into the mold cavity such that the diluted thermosetting polyimide resin system permeates and wets the fiber preform without damaging the three-dimensional architecture of the fiber preform;

evaporating and removing at least a portion of the solvent from the diluted thermosetting polyimide resin system by heating the mold cavity to a temperature of about 65° C. to about 95° C. and maintaining the temperature until at least 95 weight percent of the solvent has evaporated from the diluted thermosetting polyimide resin system to yield a less diluted thermosetting polyimide resin system;

further heating the mold cavity to a temperature of about 200° C. to about 215° C. and imidizing the less diluted thermosetting polyimide resin system to form an imidized thermosetting polyimide resin system, and applying a vacuum to the mold cavity to remove condensation byproducts produced during the imidizing step;

curing the imidized thermosetting polyimide resin system by further heating to a temperature sufficient to remelt the imidized thermosetting polyimide resin system, and then applying a pressure of about 1.5 MPa to about 7 MPa to the remelted imidized thermosetting polyimide resin system and further heating the remelted imidized thermosetting polyimide resin system to cross-link the remelted imidized thermosetting polyimide resin system and thereby produce the article, the article having a void content of less than three percent.

10. The method as recited in claim 9 wherein the curing step is performed by a process chosen from the group consisting of molding within the mold cavity, compression molding, and autoclaving at a temperature of about 315° C.

11. The method as recited in claim 9 wherein the solvent constitutes about 30 to about 50 weight percent of the diluted thermosetting polyimide resin system after the diluting step.

12. The method as recited in claim 9, wherein after the evaporating and removing step, the method further comprises the steps of:

cooling the mold cavity to a temperature of about room temperature up to about 35° C.;

injecting an additional quantity of the diluted thermosetting polyimide resin system into the mold cavity to compensate for the evaporation of the solvent; and then reheating the mold cavity to a temperature of about 65° C. to about 95° C. to evaporate solvent in the additional quantity of the diluted thermosetting polyimide resin system.

13. The method as recited in claim 9 further comprising a post cure operation in which the article is post-cure heated to a temperature of about 310° C. to about 320° C. to achieve further cross-linking of the imidized thermosetting polyimide resin system and thereby raise the glass transition temperature of the article.

14. The method as recited in claim 9 wherein the three-dimensional architecture of the fiber preform is chosen from the group consisting of braided, knitted woven and filament wound.

15. A method for resin transfer molding a fiber-reinforced article from PMR-15 thermosetting polyimide resin system consisting essentially of, in weight percent, about 30 to 40% MDA, about 40 to 50% BTDE, and about 20 to 30% NE, the method comprising the steps of:

positioning in a mold cavity an unimpregnated fiber preform having a complex reinforcement architecture chosen from the group consisting of three-dimensional braided, knitted, woven and filament wound;

diluting the PMR-15 thermosetting polyimide resin system with about 30 to about 50 weight percent of a solvent to achieve a viscosity of about 100 centipoise or less, the diluted PMR-15 thermosetting polyimide resin system being in an uncured state and containing unreacted MDA;

injecting the diluted PMR-15 thermosetting polyimide resin system into the mold cavity under a pressure of about 7 kPa to about 100 kPa and at a temperature of about room temperature up to about 35° C. such that the diluted PMR-15 thermosetting polyimide resin system permeates and wets the unimpregnated fiber preform without damaging the complex reinforcement architecture of the unimpregnated fiber preform;

evaporating and removing at least a portion of the solvent from the diluted PMR-15 thermosetting polyimide resin system in the wet fiber preform, by heating the mold cavity to a temperature of about 65° C. to about 95° C. to yield a less diluted PMR-15 thermosetting polyimide resin system in the wet fiber preform;

imidizing the less diluted PMR-15 thermosetting polyimide resin system in the wet fiber preform by subjecting the mold cavity to a controlled heating procedure while applying a vacuum to the mold cavity to remove condensation byproducts produced during the imidizing step, the controlled heating procedure comprising the steps of maintaining the less diluted PMR-15 thermosetting polyimide resin system in the wet fiber preform at a temperature of about 65° C. to about 95° C. until at least 95 weight percent of the solvent has evaporated from the less diluted PMR-15 thermosetting polyimide resin system in the wet fiber preform, and then further heating the less diluted PMR-15 thermosetting polyimide resin system in the wet fiber preform to a temperature of about 200° C. to about 215° C. to yield an imidized PMR-15 thermosetting polyimide resin system in the wet fiber preform;

curing the imidized PMR-15 thermosetting polyimide resin system by remelting and applying pressure to the remelted imidized PMR-15 thermosetting polyimide resin system to cause the imidized PMR-15 thermosetting polyimide resin system to cross-link and produce a cured fiber-reinforced article; and performing a post cure operation in which the cured fiber-reinforced article is post-cure heated to a temperature of about 310° C. to about 320° C. to achieve further cross-linking of the imidized PMR-15 thermosetting polyimide resin system and thereby raise the glass transition temperature of the cured fiber-reinforced article, and thereafter cooling the cured fiber-reinforced article;

wherein the cured fiber-reinforced article has a void content of less than three percent.

* * * * *